Figure 1:
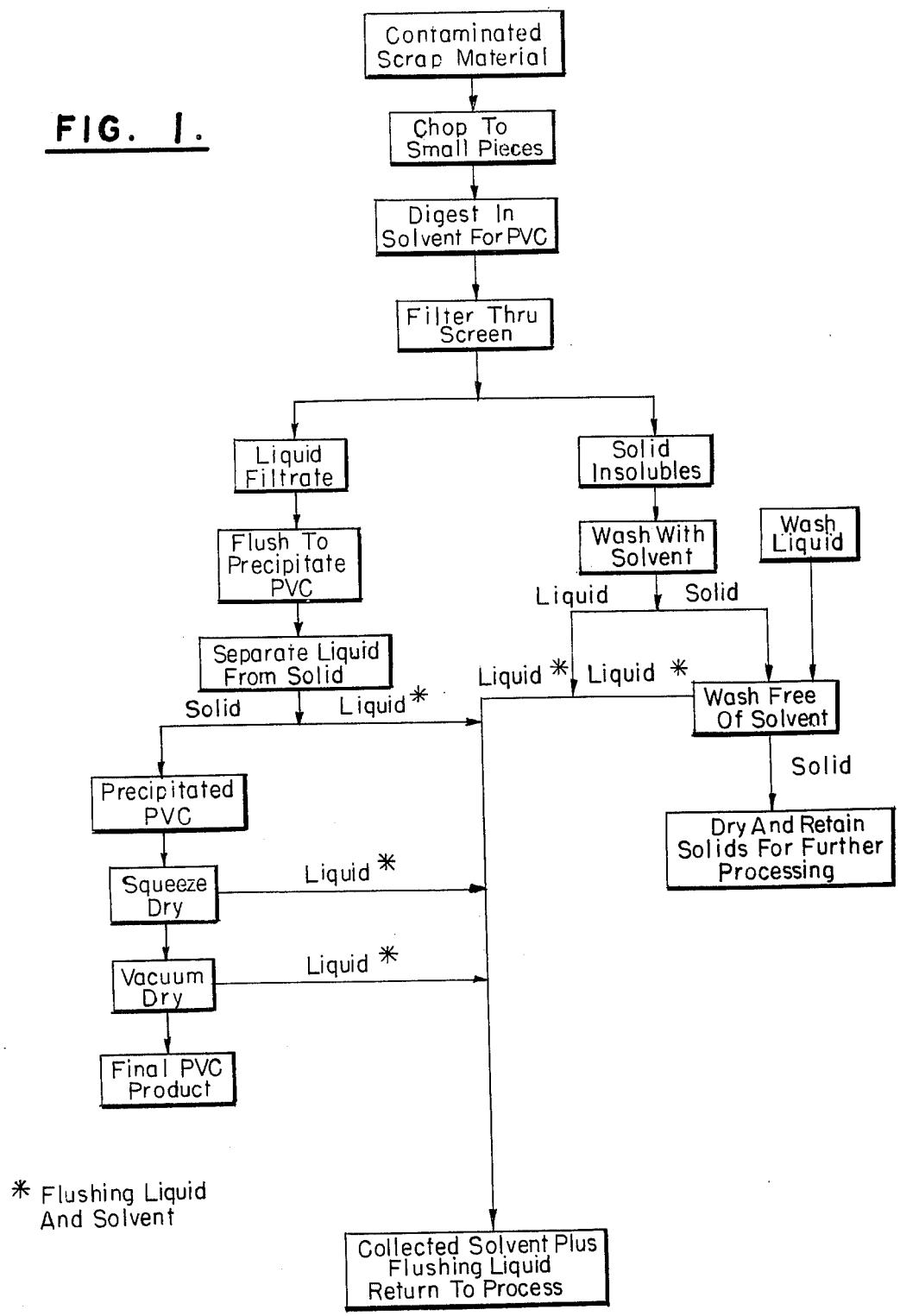

United States Patent [19]

Wainer

[11] 3,912,664

[45] Oct. 14, 1975

[54] RECOVERY OF FLEXIBLE AND RIGID MATERIALS FROM SCRAP POLYVINYLCHLORIDE, ITS COPOLYMERS AND COGENERS

[75] Inventor: Eugene Wainer, Cleveland, Ohio

[73] Assignee: Horizons Incorporated, Cleveland, Ohio

[22] Filed: Aug. 23, 1974

[21] Appl. No.: 500,118

[52] U.S. Cl. ............ 260/2.3; 260/87.5 R; 260/87.7; 260/91.5; 260/92.8 A
[51] Int. Cl.$^2$ .................... C08J 11/02; C08J 11/04
[58] Field of Search ...................... 260/2.3, 92.8 A

[56] References Cited
UNITED STATES PATENTS

| | | | |
|---|---|---|---|
| 3,111,506 | 11/1963 | Roussillon et al. | 260/92.8 A |
| 3,666,691 | 5/1972 | Spiller | 260/2.3 |
| 3,836,486 | 9/1974 | Hafner | 260/2.3 |

Primary Examiner—Wilbert J. Briggs, Sr.
Attorney, Agent, or Firm—Lawrence I. Field

[57] ABSTRACT

Plastic compositions based on polyvinylchloride, polyvinyldichloride, polyvinylidene chloride and their copolymers available in the form of scrap may be processed by solution techniques to yield a flexible, semi-rigid, or rigid variation of the original composition practically irrespective of the degree of physical contamination of the original plastic composition.

The entire composition in the form as available in the original heavily contaminated scrap is recovered in pure form without such contamination by treating the scrap with a polar aprotic solvent, separating the contaminants from the solution by screen filtration, precipitating the desired ingredients of the plastic composition by flushing the polar aprotic solution of the polymer with water, separating all of the polar aprotic solvent dissolved in water by a combination of squeezing and vacuum evaporation, and finally separately recovering the water used for flushing and the polar aprotic solvent in substantially water-free form by distillation. The polar aprotic solvent utilized for placing the plastic in solution must be one which does not form an azeotropic mixture with water.

In order to produce rigid varieties of these types of plastic compositions, the same general procedure is utilized, except that the liquid used for precipitation of the plastic dissolved in the polar aprotic solvent is selected from aliphatic alcohols, aliphatic straight chain saturated hydrocarbons, saturated hydrocarbons such as kerosene and turpentine, cyclic saturated hydrocarbons and glycols.

16 Claims, 5 Drawing Figures

* Flushing Liquid And Solvent

FIG. 2A.
Flushing With Water
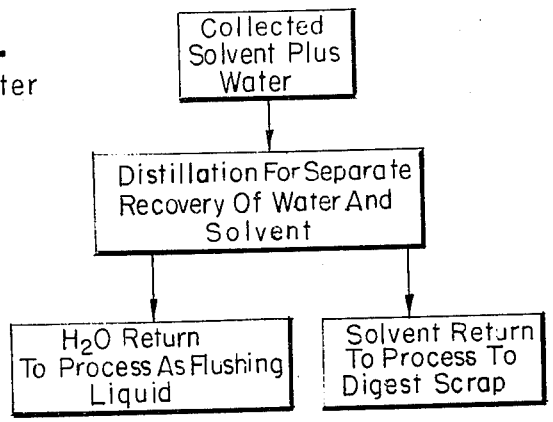
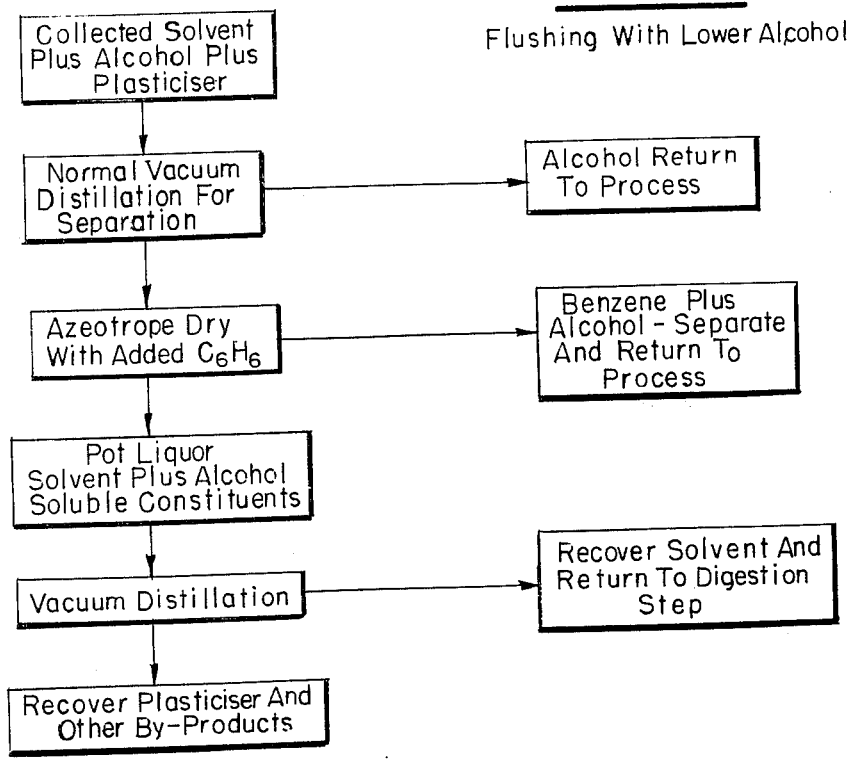
FIG. 2B.
Flushing With Lower Alcohol Flushing With Hydrocarbon Flushing With Alcohol And Hydrocarbon

3,912,664

RECOVERY OF FLEXIBLE AND RIGID MATERIALS FROM SCRAP POLYVINYLCHLORIDE, ITS COPOLYMERS AND COGENERS

In this modification, all of the plasticizer content of the composition goes into solution as before but when the solution is flushed with these specialized solvents rather than with water, the plasticizer content plus minor amounts of other portions of the composition remain in solution and what is precipated out is a plastic composition substantially free of plasticizer. The plasticizer content is recovered, if desired, by normal distillation procedures, it being a requirement in this case also that the organic flushing solvent be non-azeotropic with regard to the dissolving solvent and the flushing solvent must have a boiling point of at least 50°C less than that of the dissolving polar aprotic solvent. The ideal and preferred condition for separation of plasticizer is the use of an organic plastic precipitating liquid in which both the plastic and the plastic solvent are insoluble, whereby the plasticizer is easily recovered by distillation after the plasticizer containing flushing solvent has been separated out by separatory funnel techniques.

All treatments carried out in the presence of the polyvinylchloride resin are accomplished at temperatures at least 50°C below the boiling point of the polar aprotic solvent in order to prevent degradation of the resin.

BACKGROUND OF THE INVENTION

Polyvinylchloride, its copolymers, and its congeners, are among the most widely used synthetic resins. This wide use is due to the tremendous spectrum of properties which may be imparted to this important category of synthetic resins and to the exceptional number of applications which develop as a result of this product diversity.

In many of these applications, the very nature of the manufacturing process is such that a significant portion of the original raw material ends up in the form of scrap produced in the manufacturing operation. Examples of such applications where a large amount of in-plant scrap is produced are included in items such as flooring, wall coverings, furniture, automobile upholstery, auto tops, automotive decorative trim, and the like. A particularly important source of scrap is that available from wire and cable insulation which represents a major application for the family of vinyl chloride polymers. Vinyl insulated wire, whether prepared improperly in the plant, or whether obtained through normal scrap outlets is normally chopped to fine pieces of the order of one-eighth inch long to permit mechanical separation of the copper from the vinyl coating. The process is reasonably efficient and up to at least 90 percent of copper available from such a source usually can be recovered leaving a residue generally containing more than 80 percent of polyvinylchloride composition.

Heretofore the majority of the vinyl scrap which was available either as a consequence of in-plant practices or through the normal channels of the scrap market had relatively little value because of the low cost of the original raw material. Consequently, and particularly for in-plant scrap, the product represented a nuisance and the normal practice was to contract for its haulage from the plant to landfill sites. In view of the wide shortage of raw materials developing at the present time, this practice is changing rapidly.

The family of the polymerized vinyl chlorides representing the subject matter of this invention include polyvinylchloride, polyvinyldichloride, polyvinylidenechloride, and their copolymers. The nature and percentage of the copolymers, added polymers, and plasticizers present in the scrap depend on the properties and applications of the original material.

In the case of polyvinylchloride, the amount of copolymer utilized, generally as an admixture to the homopolymer, usually covers a range between 3 and 40 percent, a range between 10 and 20 percent being the most common. Among the most popular copolymers of polyvinylchloride are those with vinyl acetate and vinylidenechloride. Added polymers for specific uses include chlorinated polyethylene and thermoplastic elastomers such as butadiene acrylonitrile copolymer.

For the polyvinylidene chlorides, the most common copolymers are those made with vinyl chloride, alkyl acrylates, and acrylonitrile.

An increasingly important classification of vinyls resides in the expression "rigid versus flexible," and broad variations in physical performance of polymer compositions between the terms "rigid" and "flexible" are available. While a considerable degree of physical flexibility tends to be imparted through the practice of copolymerization, the most common and most useful procedure is through the addition of compatible plasticizers. Plasticizers are generally high boiling type liquids or low molecular weight polymers which alter the processing and physical properties of the vinyls. Plasticizers increase resin flexibility, softness and elongation; improve low temperature flexibility; reduce processing temperature and melt viscosity. Commonly used plasticizers are high boiling point esters and are mono, di, and tri-esters of acids or acid anhydrides such as phthalic, adipic, azelaic, sebacic, citric, and the like with monohydric alcohols. Plasticizers made by esterification of a mixture of alcohols are commonly called "mixed esters" or "mixed plasticizers." The alcohols used to produce plasticizers can be straight chain or branched and those produced from straight chain alcohols have been efficiency, low temperature flexibility, low volatility, low viscosity and improved viscosity stability in thermal compounding. Plasticizers, properly chosen, yield a combination of properties which are difficult to obtain in any other way.

Generally speaking, a polyvinylchloride composition containing less than 3 parts per 100 of plasticizer is designated as rigid whereas a polyvinylchloride composition which contains between 40 and 60 parts of plasticizer per 100 parts of resin is designated as flexible. As indicated, in the majority of cases, the difference in properties between the two is a function of the percentage of plasticizer.

Rigid vinyls have poor impact resistance. Addition of a thermoplastic elastomer in the range of 10 to 20 percent exhibits a marked effect in improving the poor impact resistance of rigid vinyls. These thermoplastic additives are classified as impact modifiers.

In view of extremely broad applications of polymerized vinyl compounds, equally broad variations in the composition of the compound can be anticipated. Further, in general, the ususal compounded polyvinylchloride composition and its congeners may contain some or all of the following; the homopolymer or copolymer, a mixture of homopolymer and copolymer, plasticizers, heat stabilizers, inorganic fillers and pigments, colorants, processing aids, impact modifiers lubricants, light stabilizers, flame retardants, anti-oxidants, and possibly foaming agents.

THE PRIOR ART

A common and growing application for vinyl compounds is the manufacture of coatings and coverings for automobiles and for furniture. This generally involves the adhesive lamination of a textured vinyl onto a fabric comprised of cotton, wool, or synthetic fibrous material.

U.S. Pat. No. 3,624,009 describes a procedure for recovering the polymeric compound plus all of its added ingredients without separation, by washing or treating the scrap fabric supported synthetic resin with a cyclic ether under controlled conditions of heat, pressure, agitation and atmosphere. Clean solvent is recovered at various stages by evaporation. Water and air must be excluded rigidly from the process since the cyclic ethers utilized produce azeotropes which make economical recovery of the solvent difficult and expensive. In addition, the cyclic ethers form peroxides on exposure to air leading to the possibility of spontaneous explosion. However, in spite of the care and precaution taken and described in the referenced patent, it is clear that in view of the extremely wide variety of material which may be used in the compounding of polyvinylchloride materials, that compounds may be present which permit the formation of the cyclic ether peroxide even in the absence of air thus leading again to the possibility of a spontaneous explosion. Finally, elevated temperatures are required with these extremely potent solvents in order to make the process operate efficiently in accordance with the teachings of the referred to patent. In view of the exceptionally powerful nature of the solvent employed, chiefly tetrahydrofuran, a significant degradation takes place under these conditions and this rate of degradation tends to accelerate since the products of degradation continue to be retained in the final product removed from the process, this being the desired polyvinylchloride compound.

Other prior art of which the applicant is aware includes the following:

Canadian Pat. No. 617,788 issued Apr. 4, 1961 which describes a process in which tetrahydrofuran alone or in conjunction with various ketones is used to dissolve polyvinylchloride and to separate the solution from wire covered with the polymer. The resin is recovered from the solution when the solution is injected into hot water. U.S. Pat. No. 2,284,142 which issued May 26, 1942 describes a process in which a copolymer coating consisting of polyvinylchloride and polyvinylacetate is first saturated with water and then dissolved in a solvent which is not miscible with water. The dissolved coating material is precipitated from solution by means of a liquid which is miscible with the solvent.

U.S. Pat. No. 2,832,663 issued Apr. 29, 1958 describes a process in which polyvinylchloride is removed from textile fibers by means of alcohol-caustic mixtures at relatively high temperatures.

U.S. Pat. No. 3,666,691 issued May 30, 1972 describes the use of a solvent mixture consisting of dimethylsulfoxide, trichloroethylene and methylethyl ketone to remove polyvinylchloride coatings from copper wire.

U.S. Pat. No. 3,696,058 issued Oct. 3, 1972 describes the use of hexafluoroisopropanol as a solvent for the recovery of thermoplastic polymers.

SUMMARY OF DESCRIPTION OF THE INVENTION

Substantially any type of scrap polyvinylchloride and its congeners can be utilized for the purpose of this invention including but not necessarily limited to chopped wire and cable insulation contaminated with copper and other plastics, wall coverings contaminated with adhesive and paint, film and sheeting normally utilized for packaging, sound records, automobile tops, floor mats, upholstery of the automotive, home and luggage type, fabric for rainwear, and the like.

The invention will be more fully understood in the description which follows taken with the drawings in which:

FIG. 1 is a flow sheet showing a preferred processing sequence for scrap containing a flexible polyvinylchloride composition, and FIG. 2A, 2B, 2C and 2D are flow sheets showing modifications of the process of FIG. 1.

Figure 2C:
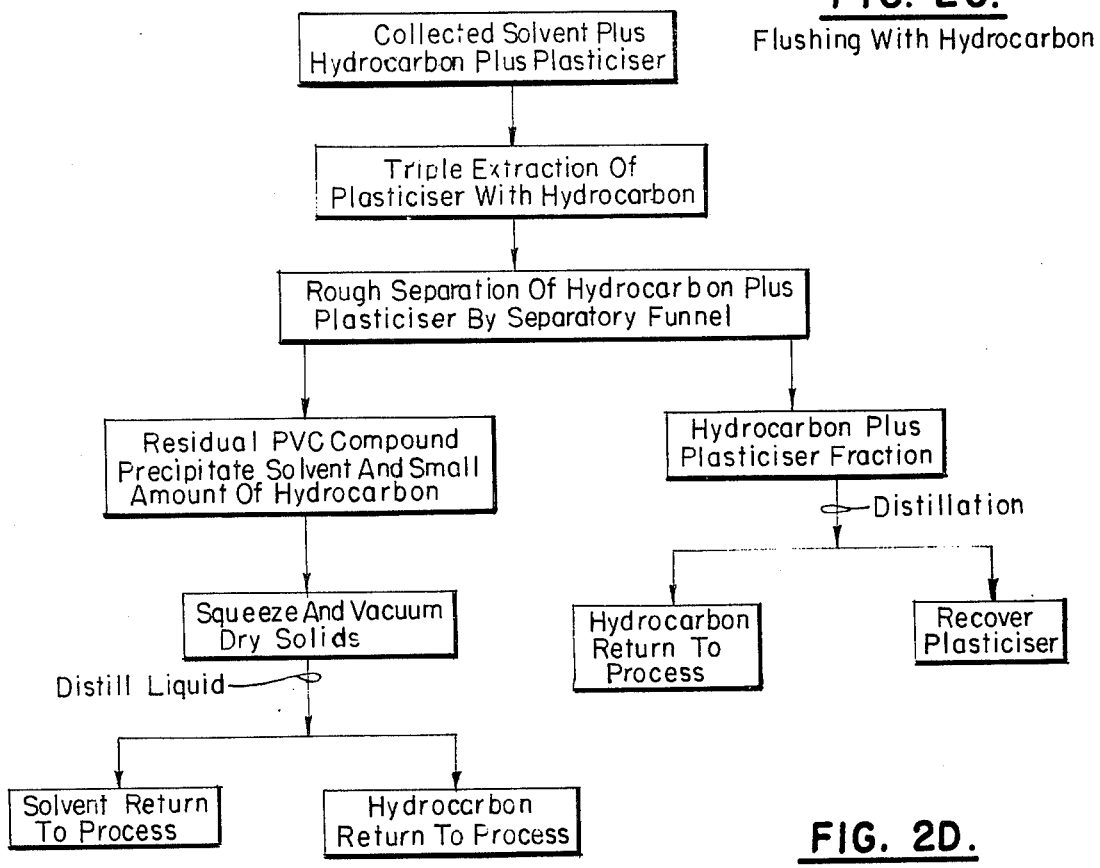
Figure 2D:
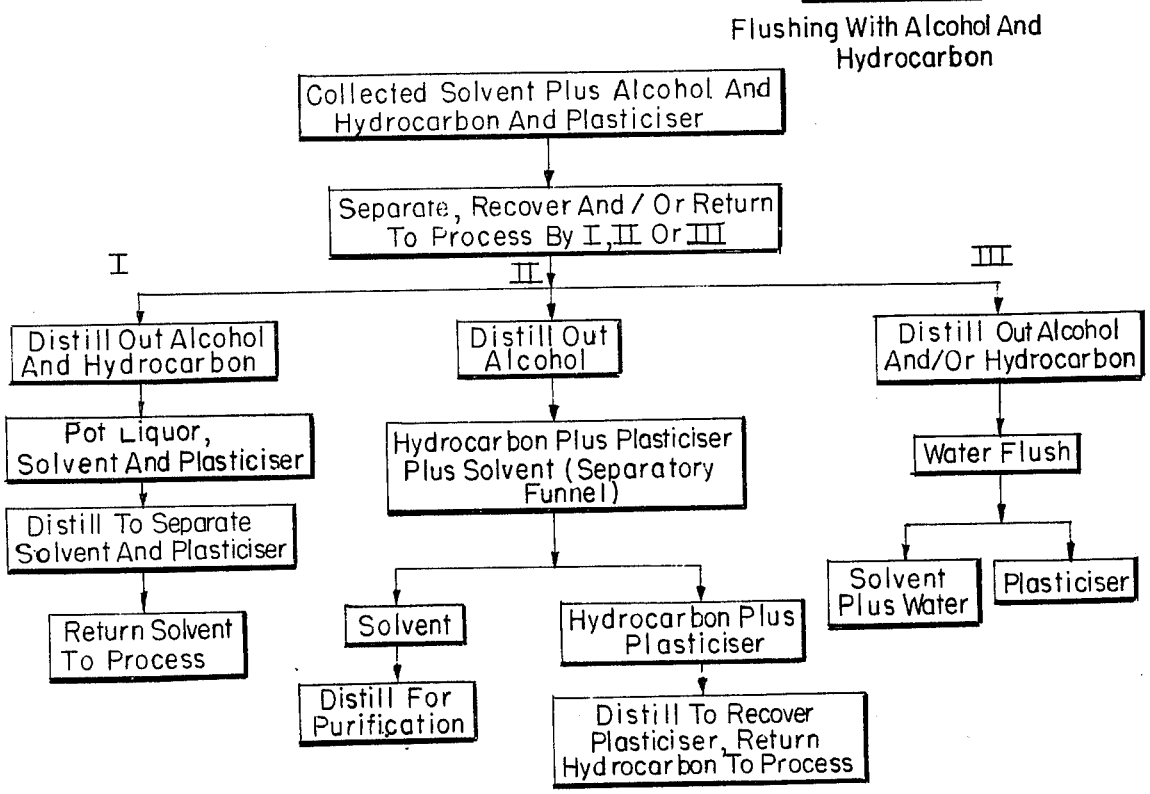

In the modification shown in FIG. 2A, the plasticizer is insoluble in the flushing liquid and hence it is retained in the recovered polyvinylchloride composition, said composition being recovered in the flexible state. In the modifications shown in FIGS. 2B, 2C and 2D, the processes permit separate and reusable recovery of the plasticizer and an essentially plasticizer-free polyvinylchloride composition fraction which then can be used as a base for the production of impact resistant rigid type of polyvinylchloride compositions.

In the process shown in FIG. 1, after receipt. the scrap material is first chopped to a fine size preferably of the order of one-eighth inch. Then 1 to 40 parts of the chopped scrap is digested with 100 parts of a polar aprotic solvent or mixtures of such solvents (see Table 1) at temperatures not exceeding 50°C. Those polar aprotic solvents suitable for the purposes of this invention are unique in that they are extremely soluble (up to infinite solubility) in water and they do not receipt, azeotropes with water. The mixture of polyvinylchloride contaminated scrap and non-azeotropic forming polar aprotic solvent is digested for an appropriate period of time with stirring until all of the polyvinylchloride values are in solution. The mixture is then filtered through a 400 mesh (Tyler standard) stainless steel screen, preferably on a centrifuge spinning until the undissolved residue is as dry as possible. The undissolved residue is removed from the surface of the screen, returned to a digestion tank and again digested with the polar aprotic, non-azeotropic forming solvent in a ratio of 50 parts of undissolved material and 100 parts of the polar aprotic solvent. It is again made as solvent-free as possible by treatment on a centrifuge fitted with a 400 mesh stainless steel screen after which the material on the screen is washed free of solvent with water. The material left on the screen, now free of solvent and any polyvinylchloride components is dried and is retained for further recovery and/or separation.

The filtrate (obtained from the first solution treatment and which contains all of the soluble ingredients in the original scrap plus insoluble ingredients such as pigments which have a particle size which permits them to pass through the screen) is sprinkled into water with rapid stirring using at least equivalent volumes of water and filtrate and up to 3 parts of water to 1 part of filtrate for the step which is designated as "a flushing step" in FIG. 1. This step precipitates the polyvinylchloride plus a number of extraneous ingredients. The compound is in a heavily swollen form so that all extraneous materials such as clay fillers, stabilizers and the like are gathered by the gel-like form of the precipitated polyvinylchloride. The swollen mass containing a mixture of polar aprotic solvent plus a significant amount of water, is then passed through squeeze rolls made of stainless steel. This squeeze roll treatment is repeated several times eventually yielding an end product which contains roughly 95 percent solids and 5 percent of water and the polar aprotic solvent. After this stage the sheeted material is vacuum dried at temperatures of 50° C. or less to yield the final desired polyvinylchloride composition with all of the desired ingredients still retained and with the physical properties of the original raw material unimpaired.

At each stage of the process, the water plus the polar aprotic solvent removed at that particular stage is retained and collected. As seen from FIG. 1 this collection includes polar aprotic solvent plus water removed from the polyvinylchloride composition by squeezing and polar aprotic solvent collected from washing the precipitates which are obtained from the first filtration. All of the washings are recovered in a single vessel and the polar aprotic solvent and the water are separated from each other by distillation, after which both the water and the polar aprotic solvent can be returned to the process in relatively pure and completely reusable form.

The process described yields a polyvinylchloride product whose properties and composition (with the exception of the removal of the asbestos from the floor tiling type composition) are essentially equivalent to the original composition present in the scrap material. Thus, if the composition was originally flexible, the recovered material is flexible. It the composition was originally rigid, the product obtained as a consequence of the process described is also rigid. Further, coloring matter, which is usually in the form of inorganic or organic pigments remains insoluble during the process or, in other words, is not solubilized, and this is also recovered quantitatively so that the original color of the compound is still retained, since the particle size of these pigments is fine enough for passage through the filter.

In the process which has just been described, if one desires to make a flexible composition from a rigid composition recovered by the process, this is done effectively and simply by the addition of plasticizers.

The reverse procedure is part of the invention described in this specification and is shown in FIGS. 2B, C and D. In the process shown in FIGS. 2B, C and D instead of using water for flushing precipitation of the polyvinylchloride compound, an organic liquid such as methyl alcohol, ethyl alcohol, hexane, octane, nonane, decane, kerosene, turpentine, gasoline, cyclic saturated hydrocarbons, glycols, or the like is utilized. This treatment separates the plasticizers and will extract also the light stabilizers and the anti-oxidants but has relatively little effect on the heat stabilizers and lubricants. Thus a precipitate is obtained comprised primarily of a mixture of polyvinylchloride resin, heat stabilizer, lubricant and coloring pigment. The plasticizer, light stabilizer and anti-oxidant remain in solution. In utilization of this procedure, the water substitute is removed in the final recovery step by distillation which then leaves primarily the plasticizer and the polar aprotic solvent and these can be separated from each other by distillation, if desired. FIG. 2B shows the process utilized if the water substitute is soluble in the polar aprotic solvent. A much simpler procedure may be utilized if the water substitute is insoluble in the polar aprotic solvent and such procedure is depicted schematically in FIG. 2C.

In the procedure shown in FIG. 2B, when the liquid used for precipitation of the polyvinylchloride compound comprises one or more of the lower aliphatic alcohols listed in Table 2A, i.e. the group consisting of methyl alcohol, ethyl alcohol, propyl alcohol and butyl alcohol, from 1 to 3 volumes of alcohol per volume of solution of the polyvinylchloride are utilized to accomplish the alcohol flushing. The polyvinylchloride solution is sprayed with stirring into the alcohol utilized for flushing. As a consequence of this treatment, the polyvinylchloride is precipitated out, leaving an alcohol-containing solution containing substantially all of the plasticizer, the anti-oxidants (e.g. bisphenol A) and a small percentage of the heat stabilizer(s) (generally not more than 5 percent of the total content) which are usually fatty acid derivatives of metal compounds and the polar aprotic solvent. The polyvinylchloride is then recovered in the same manner as in FIG. 1 by passage through squeeze rolls followed by vacuum drying to yield a polyvinylchloride composition containing less than 3 percent plasticizer and therefore suitable for rigid polyvinylchloride applications. The several alcohol solutions are collected together, the major portion of the alcohol is distilled off by normal vacuum distillation techniques and final removal of the alcohol is accomplished in later stages of this distillation by a so-called "azeotropic dry and distillation technique" which involves the addition of approximately 10 parts of benzene to 100 parts of the pot liquor remaining in the still and continuing the distillation to yield a benzene-alcohol fraction with substantially no alcohol left in the solvent used initially for placing the polyvinylchloride in solution. The benzene and alcohol are easily separated from each other by forming a triple azeotrope through the addition of straight chain hydrocarbon in a known manner. The pot liquor which remains is a solution of the plasticizer, the anti-oxidants and a very small percentage of the heat stabilizers in the solvent used initially for placing the polyvinylchloride in solution. The solvent is separated easily by vacuum distillation leaving a final pot liquor comprising the plasticizer with the small amount of heat stabilizing material, and substantially all the anti-oxidants as a fraction which may be utilized as an additive to compositions which require plasticizers for establishing commercial utility.

As in the water flushing procedure, the solvent for the resin must be recovered with substantially complete removal of the alcohol, in order for the solvent to be reused or recycled for process purposes. Usually not more than 0.2 percent water or alcohol can be tolerated, and a water content below 0.1 percent is preferred.

The most commonly used plasticizers for polyvinylchloride compositions are high boiling point esters such as phthalates, trimellitates, aliphatic diesters such as adipates, the sebacates, and the azealeates. The variation utilizing the alcohol extraction process as defined previously is particularly suited for recovery of these types of plasticizers.

Instead of alcohols listed in Table 2A, the process may be carried out using the liquid straight chain hydrocarbons listed in Table 2B with or without an added alcohol. These straight chain hydrocarbons are insoluble in the polar aprotic solvents utilized to place the polyvinylchloride composition in solution. The addition of these straight chain hydrocarbons to the dissolved polyvinylchloride composition precipitates out the polyvinylchloride while the plasticizer remains with the straight chain hydrocarbon with commercially useful partition coefficients. Thus, for example, the high boiling point esters used as plasticizers will split between the straight chain hydrocarbon and the solvent used for dissolving the entire composition. In a single extraction, approximately 70 parts of the ester type plasticizer remains with the straight chain hydrocarbon and 30 parts remains in the solvent utilized for dissolving the polyvinylchloride composition. By repeating this operation so that a total of three extractions are utilized, between 97 and 98 percent of the total plasticizer content is obtained in the straight chain hydrocarbon fraction. However, by use of a triple solvent system, this percentage extraction can be achieved in a single pass.

In the first operation, equal volumes of straight chain hydrocarbon and the solution of the polyvinylchloride composition are agitated violently together so as to create a fine dispersion of the straight chain hydrocarbon in the dissolved polyvinylchloride mixture. Under these conditions, the polyvinylchloride composition gradually precipitates out quantitatively with substantially all of the ingredients initially present in the composition with the exception of plasticizer. After the stirring is stopped, the solution is allowed to stand quietly for periods up to 1 hour, after which the straight chain hydrocarbon fraction containing the plasticizer is found as a separate layer of liquid floating on top of the solvent utilized for originally dissolving the polyvinylchloride with the polyvinylchloride precipitated out in such solvent, probably due to the presence of residual amounts of straight chain hydrocarbon. Though effective, this procedure is lengthy and requires substantial handling in view of the multiple passes required to obtain close to 100 percent extraction of the plasticizer. It has the advantage, however, that separation can be accomplished mechanically rather than through extra distillation steps.

A variation of this procedure which operates rapidly and with particular effectiveness involves the use of a triple solvent system. In this case, the polyvinylchloride composition is placed in solution as before and precipitation of the polyvinylchloride composition is accomplished through utilization of a mixture of alcohols and straight chain hydrocarbons. Usually about 1 part alcohol to 2 parts straight chain hydrocarbon is required for this purpose, and 2 parts of this mixture are used for each part of polymer solution. When this mixture is utilized, the mixed solvent is soluble in the solvent used for dissolving the polyvinylchloride composition. Precipitation of the polyvinylchloride composition is effectively immediate and the solution which remains thereafter is essentially a mixture of the solvent used to precipitate the polyvinylchloride, the alcohol, and the straight chain hydrocarbon.

In the case of the mixture of three solvents, after the polyvinylchloride compound has been removed by the techniques depicted in FIGS. 1 and 2 which includes substantially all the polyvinyl compound and its various constituents with the exception of the plasticizer in the form of the precipitated solid, the plasticizer remaining in the mixed solvent comprising a mixture of alcohol, the straight chain hydrocarbon and the original solvent for the polyvinylchloride composition, then separation of the various ingredients in the solution is accomplished readily by use of one of at least three techniques.

The aliphatic alcohols, including the glycols, and the straight chain hydrocarbons form azeotropic mixtures on distillation at atmospheric pressure. Thus, in the first method of separation, all of the alcohol and hydrocarbon can be removed by distillation at the azeotropic temperature and then at the boiling point temperature of the remaining contituent of the azeotrope which is normally somewhat higher. Since these solvents are used in conjunction with each other the fact that the azeotropic mixtures are produced is not detrimental to the recycling of these materials in the process.

Under these conditions, the solvent utilized to dissolve the initial polyvinylchloride composition containing all of the plasticizer remains and the solvent and plasticizer may be separated from each other by vacuum distillation.

In a second method, the alcohol can be removed quantitatively by distillation at reduced pressure, usually at pressures less than 100 mm, providing, however, the boiling point of the alcohol is at least 30° less than the boiling point of the straight chain hydrocarbon at room temperature. Under these reduced pressure conditions, the low boiling point alcohols, methanol and ethanol, are removed quantitatively as concentrations in the vapor form of the order of 99.5 percent or higher leaving substantially all of the higher boiling point hydrocarbon behind. Once more than 99 percent of the lower boiling point alcohol has been removed by distillation, the solution is allowed to cool, and a two-layer liquid is formed comprising a solution of plasticizer and the straight chain hydrocarbon as the upper layer and a substantially pure solution of the solvent which is utilized initially to dissolve the polyvinylchloride in the lower layer. These are usually separated one from the other by separatory techniques and the plasticizers recovered from the straight chain hydrocarbon layer by simple distillation, which may be either at atmospheric or reduced pressures, since the temperatures utilized in the range of atmospheric pressure and below are insufficient to produce a significant azeotropic effect.

A third procedure for separation of the plasticizer from the solvent used originally to dissolve the polyvinylchloride composition and which is now free of the polyvinylchloride composition, is to utilize water flushing techniques at various stages of the operation, these water flushing techniques being effectively identical whether alcohol alone is utilized as the solvent to extract the plasticizer from the polyvinylchloride composition or whether a mixture of alcohol and straight chain hydrocarbon is utilized for this purpose.

In the case of the use of the binary mixture comprising a mixture of alcohol and the solvent utilized to dissolve the polyvinylchloride composition, a solution resuits as a consequence of this operation comprising a mixture of the alcohol and resin solvent with the plasticizer. As indicated previously, the alcohol is removed from this solution by normal distillation procedures leaving a mixed solution of plasticizer and resin solvent. These can be separated from each other by distillation. The plasticizer may also be separated by flushing with water in which case a two-layer system is produced in which the plasticizer floats on top a water solution of the solvent used originally to dissolve the resin and which can be separated readily by normal separatory funnel techniques with the remaining requirement that the water be removed from the solvent used to dissolve the original resin composition, again by distillation coupled with azeotropic drying. Incidentally, azeotropic distillation drying may utilize such liquids as benzene, carbon tetrachloride, toluene, xylene and other aromatic and/or chlorinated hydrocarbons. The advantage of these types of azeotropic drying agents is that once the liquid containing the water in the vapor phase is cooled to room temperature and allowed to stand, these separate into two layers in which the mutual insolubility of the hydrocarbon and the water is such that fractions exhibiting a purity in excess of 99.95 percent are readily obtained by separatory funnel techniques. In a further variation, water may be added directly to the mixture of alcohol, plasticizer and resin solvent providing, however, the amount of water utilized for this purpose is at least 5 times the total volume of the mixed solvents. Under these conditions, again a two-layer system is obtained in which the high boiling point plasticizer ester is made available as one layer containing a small amount of alcohol and the second layer is comprised chiefly of a major amount of alcohol plus water plus the solvent utilized for the original dissolving of the polyvinylchloride compound. The distillation steps in this procedure are relatively complex compared to those described in the previous procedures and as a consequence the water flushing technique which involves the total removal of alcohol prior to the water flushing is preferred.

Effectively the same procedures can be used for the tertiary solvents. While the alcohol-straight chain hydrocarbon portion of the solvent containing the plasticizer can be removed by distillation, whether such distillation involves azeotropic distillation or not, leaving essentially a solution of the plasticizer in the solvent for the resin, this solution can be water flushed at substantially any state. If water flushed prior to distillation and when all three solvents are present, again, two layers are produced. One layer is comprised chiefly of a compatible mixture of alcohol, the solvent for the polyvinylchloride resin, and water, whereas the second layer is primarily a solution of the plasticizer and the straight chain hydrocarbon. This is separated by separatory funnel techniques and the straight chain hydrocarbon is removed from the plasticizer by distillation. However, again, if one removes all of the alcohol and the straight chain hydrocarbon by distillation prior to the water flushing step, then a condition identical to that previously described is obtained. Here, a solution comprising essentially a mixture of the plasticizer and a solvent required for dissolving the resin is available which is water flushed for separation of the two desired ingredients, followed by straight distillation coupled with azeotropic distillation for drying for recovery of the resin solvent in pure form so that it may be recycled back through the process.

The preferred solvents for these chlorine containing polyvinyl resin compositions are given in Table 1. These solvents may be used alone or in a mixture with each other. The dissolving power of these solvents for halogen containing resin materials may be increased considerably by adding to the types of solvents listed in Table 1, other liquids which may be designated as "co-solvents" these co-solvents being ketones, cyclic ethers, chlorinated diphatic and aromatic hydrocarbons, and the like. However, since the economic success of the process described herein is dependent on the capability for easy recycling and reuse of the various reagents, particularly the solvents and liquids, on a quantitative and completely dry basis, the addition of materials which appear to facilitate the solution of the plastic compound in the form of co-solvents is not recommended since it may present a needless complication in the solvent purification steps which might be required later.

Suitable plasticizer extracting solvents which may be used alone or in admixtures with each other and which are utilized in accordance with the flow sheet given in both the left and right arms of FIGS. 2B, C and D are listed in Table 2.

THE PRACTICE OF THE INVENTION

The composition of the scrap raw materials utilized for exemplifying the practice of this invention is given in Table 3. The average particle size of batch A are lengths roughly approximately one-eighth inch. The average particle size of batch B are pieces equivalent to one-fourth inch on edge square or less, whereas the average particle size of batch C (ground up in a hammer mill) is usually of the order of 40 mesh and coarser up to 10 mesh (Tyler Standard Screen).

Examples of the conditions required for dissolving these various types of scrap raw materials are given in Table 4, the items of particular significance being the time and temperature required to place the indicated type of scrap in solution in the volume of solvent defined in the table.

The fact that different types of scrap were utilized with different types of solvents is not limiting. For example, effectively identical conditions are achieved in dissolving the scrap for batch B as defined for batch A in Examples 1 through 9 with the solvents listed for Examples 1 through 9. Further, it is shown in Examples 15 through 23, again the same types of solvents as listed for Examples 1 through 9 can be utilized for batch C, except that more solvent is required to achieve workable conditions. This is due simply to the substantial increase in viscosity due to the higher content of polyvinylchloride composition in the scrap per unit of weight of original scrap. Increased solvent is used simply to facilitate handling.

TABLE 1

SOLVENTS FOR VINYL CHLORIDE AND VINYLIDENE CHLORIDE POLYMERS (WHICH DO NOT FORM AZEOTROPES WITH WATER AND WHOSE B. P. IS ABOVE 150° C.)

| SOLVENT NO. | NAME | BOILING POINT |
|---|---|---|
| 1. | Formamide | 211° C |
| 2. | N-methylformamide | 185° C |

TABLE 1-Continued

SOLVENTS FOR VINYL CHLORIDE AND VINYLIDENE CHLORIDE POLYMERS (WHICH DO NOT FORM AZEOTROPES WITH WATER AND WHOSE B. P. IS ABOVE 150° C.)

| SOLVENT NO. | NAME | BOILING POINT |
|---|---|---|
| 3. | Dimethylformamide | 153° C |
| D) | *Acetamide | 221° C |
| 5. | *N-methylacetamide | 206° C |
| 6. | Dimethylacetamide | 166° C |
| 7. | 1,1,2,2-tetraethylurea | 175° C |
| 8. | *2-pyrollidone | 245° C |
| 9. | 1-methyl-2-pyrollidone | 202° C |
| 10. | *e-caprolactam | 180° C |
| 11. | Hexamethyl phosphoric triamide | 233° C |
| 12. | Gamma-butyrolactone | 204° C |
| 13. | Dimethylsulfoxide | 189° C |
| 14. | *Sulfolane | 287° C |

*Solvents whose freezing point is at or above room temperature.

TABLE 2

PLASTICIZER EXTRACTING SOLVENTS

A. ALCOHOLS

| NO. | NAME | BOILING POINT AT ATMOSPHERIC PRESSURE |
|---|---|---|
| 1. | Methanol | 65° C |
| 2. | Ethanol | 78° C |
| 3. | 1-propanol | 97° C |
| 4. | 2-propanol | 82° C |
| 5. | N-butanol | 117° C |
| 6. | Sec-butanol | 100° C |
| 7. | Tert-butanol | 83° C |

B. SATURATED HYDROCARBONS

| NO. | NAME | BOILING POINT |
|---|---|---|
| 8. | Cyclohexane | 81° C |
| 9. | Cyclopentane | 49° C |
| 10. | Hexane | 68° C |
| 11. | Heptane | 98° C |
| 12. | Octane | 126° C |
| 13. | Lead-Free Aviation Gasoline | 125° C |
| 14. | Low Boiling Point Kerosene | 125° C |
| 15. | Turpentine | 150 to 170° C |
| 16. | Iso-octane | 100° C |

TABLE 3

COMPOSITION OF SCRAP RAW MATERIAL

A = Chopped Wire Scrap after Removal of Majority of Copper
B = Chopped Fabric Backed Upholstery (Automotive)
C = Ground up Record Stock

| BATCH A | | BATCH B | | BATCH C | |
|---|---|---|---|---|---|
| PERCENTAGE | MAKEUP | PERCENTAGE | MAKEUP | PERCENTAGE | MAKEUP |
| 87.0% PVC Composition | 100 PVC (homopolymer) 55 Plasticizer 18 Others | 80% PVC Composition | 100 PVC (homopolymer 50 Plasticizer 13 Others | 99.0% PVC Composition | 65 (homopolymer) 35 copolymer of chloride and acetate 8 others |
| 2.5% Metal | 100% Cu | 20% | Cotton or polyester or both types of fabric. | | |
| 10.5% Others | Mixture of Polyethylene, paper, cotton and polyester fiber. | | | 1.0% | Paper and dirt. |

TABLE 4

EXAMPLES OF DISSOLVING CONDITIONS

| EXAMPLE NO. | SOLVENT NO. | SCRAP BATCH A | VOL. OF SOLVENT IN CC'S | TEMPERATURE °C. | TIME MINUTES |
|---|---|---|---|---|---|
| 1. | 1 | 100g | 600 | 50° | 45 |
| 2. | 2 | " | 500 | 40° | 30 |
| 3. | 3 | " | 400 | 30° | 20 |
| 4. | 6 | " | 400 | 30° | 20 |
| 5. | 7 | " | 700 | 50° | 45 |
| 6. | 9 | " | 400 | 30° | 20 |
| 7. | 11 | " | 400 | 25° | 15 |
| 8. | 12 | " | 500 | 40° | 30 |
| 9. | 13 | " | 400 | 30° | 20 |
| 10. | 50% No. 3 + 50% No. 4 | 100g Batch B | 500 | 40° | 20 |
| 11. | 50% No. 3 + 50% No. 5 | " | 500 | 40° | 20 |
| 12. | 50% No. 3 + 50% No. 8 | " | 500 | 40° | 20 |
| 13. | 50% No. 3 + 50% No. 10 | " | 500 | 40° | 20 |
| 14. | 50% No. 13 + 50% No. 14 | " | 500 | 40° | 20 |
| 15. | 1 | 100g Batch C | 750 | 50° | 60 |
| 16. | 2 | " | 700 | 40° | 40 |
| 17. | 3 | " | 575 | 30° | 30 |
| 18. | 6 | " | 575 | 30° | 30 |
| 19. | 7 | " | 900 | 50° | 60 |
| 20. | 9 | " | 575 | 30° | 30 |
| 21. | 11 | " | 575 | 25° | 20 |
| 22. | 12 | " | 700 | 40° | 45 |
| 23. | 13 | " | 600 | 30° | 30 |
| 24. | 50% No. 3 + 50% No. 9 | 100g Batch A | 400 | 25° | 10 to 15 |
| 25. | 50% No. 3 + 50% No. 13 | " | 400 | 25° | 10 to 15 |
| 26. | 33⅓% No. 3 + 33⅓% No. 9 + 33⅓% No. 13 | " | 400 | 25° | 8 to 10 |

EXAMPLE 27

The dispersion and solution obtained as a result of the operation of Example 3, involving solvent No. 3 is then treated in accordance with the flow sheet given in FIG. 1. 200 cc's more of the solvent No. 3 are required for the various washing and cleaning steps making 600 cc's in all. The polyvinylchloride composition was separated out of the dimethylformamide solution by flushing with 1000 cc's of water. Ater removal of the polyvinylchloride composition from the flushing solution, passage through the squeeze rolls and vacuum drying, 86.5 grams of polyvinylchloride composition was recovered and 13.2 grams of a mixture of copper wire, polyethylene, paper, cotton and polyester fiber were recovered as insolubles coarser than 400 mesh from the original dimethylformamide solution of the polyvinylchloride scrap. This represents a yield of useful polyvinylchloride composition in excess of 99 percent of the original polyvinylchloride composition present in the scrap batch.

All of the water, dimethylformamide and mixed water dimethylformamide fractions available from the squeeze process and from the vacuum drying process were collected together and yielded a total of approximately 1800 cc's in volume of which, presumably, 1200 cc's comprised water and the balance was dimethylformamide. Utilizing a triple effect evaporator system, finishing off at 100 mm of pressure, most of the water was evaporated free of dimethylformamide. During this operation, approximately 1150 cc's of substantially pure water was recovered. The pot liquor comprising a mixture of a major amount of dimethylformamide and a minor amount of water was cooled to room temperature, the pressure was released, and 500 cc's of benzene were added and the distillation was continued at atmospheric pressure at a temperature of approximately 70° C. Under thes conditions, the azeoptrope between benzene and water (boiling point 69° C.) came off leaving 590 cc's of dry residual dimethylformamide, a recovery of more than 98 percent of the original processed dimethylformamide utilized in this example, and such recovered dimethylformamide can be returned to the process for reuse. The condensed azeotrope was allowed to stand and substantially all of the benzene utilized for the azeotropic drying distillation was recovered from the upper layer by conventional liquid separation techniques.

EXAMPLE 28

Example 27 was repeated except that the solvent of Example 6 was utilized, the solvent being 1-methyl-2-pyrrolidone. In this example, the azeotropic drying was accomplished by the addition of carbon tetrachloride in equal volume as a replacement for the benzene. Approximately the same yields and results were obtained in this example as in Example 27, namely more than 99 percent of the polyvinylchloride composition was recovered separate from the copper wire and the other contaminants present in the raw material and more than 98 percent of the original solvent was recovered for return to process.

EXAMPLE 29

Example 27 was repeated except that Example 9 conditions utilizing solvent 13 were used. In this example, benzene azeotropic distillation was again used for final drying of the solvents so that they could be returned to the process. Again, more than 99 percent of the polyvinylchloride composition and more than 98 percent of the processed solvent was recovered in usuable condition by following the procedures given in FIG. 1.

EXAMPLE 30

Using 1-methyl-2-pyrrolidone as the solvent for 100 grams of polyvinylchloride scrap, Batch A, the flushing was accomplished in anhydrous methyl alcohol. By utilizing procedure A shown in FIG. 2, a pot liquor was obtained comprising a solution of the plasticizer plus small amounts of other ingredients originally present in the polyvinylscrap dissolved in 1-methyl-2-pyrrolidone. The plasticizer was separated from the 1-methyl-2-pyrrolidone by vacuum distillation. 28.2 grams of product was obtained which was approximately 102 percent of the weight of the plasticizer available in the original scrap material. 58.8 grams of a polyvinychloride composition effectively free from plasticizer was obtained which represents a yield slightly in excess of 99 percent. Analysis of the plasticizer and liquid established that the excess over 100 percent yield was due primarily to the presence of a mixture of an anti-oxidant, lubricant, and a very small amount of stabilzer. It was found that the plasticizer could be added directly to fresh polyvinylchloride with only minor allowances required for the addition of suitable amounts of anti-oxidant, lubricant and heat stabilizer.

EXAMPLE 31

Example 30 was repeated, except that after the alcohol had been distilled off, the solution comprising plasticizer dissolved in 1-methyl-2-pyrrolidone was flushed with water, giving a two-layer system which yielded approximately 28 grams of liquid (again slightly more than 100 percent yield) but consisting chiefly of an ester type plasticizer. The 1-methyl-2-pyrrolidone was returned to process by a combination of vacuum distillation and azeotropic distillation for removing the last amounts of water.

EXAMPLE 32

Using 100 grams of Batch A, a mixture of 50 parts by volume of methanol and 100 parts by volume of normal octane were used as the flushing solvent and procedure B of FIG. 2 was followed. After removal of the polyvinylchloride containing constituents other than the plasticizer the residual liquid comprising a mixture of methanol, normal octane, plasticizer, and 1-methyl-2-pyrrolidone was subjected to vacuum distillation at 100 mm which resulted in quantitative removal of the methyl alcohol. On allowing the pot liquor to cool to room temperature and increasing the pressure to atmospheric a two-layer system was obtained which was then separated into an octane layer containing the plasticizer and a 1-methyl-2-pyrrolidone layer containing traces of non-water impurities which had been extracted from the scrap. Since the 1-methyl-2-pyrrolidone does not contain water, alcohol, or octane in significant amounts, it may be returned to process for recycling without fruther treatment. However, if desired, further purification of any residual octane may be accomplished by vacuum distillation at 400 mm.

The plasticizer was recovered by distilling off the octane at atmospheric pressure from the plasticizer liquor.

EXAMPLE 33

Example 32 was repeated, except that the vacuum distillation of the mixture of methyl alcohol, octane, plasticizer, and the 1-methyl-2-pyrrolidone, was carried out in a multiple effect evaporator in which the temperature rose to 60° C. and a pressure range between 100 mm and 200 mm of mercury was utilized. Under these conditions, the methyl alcohol and octane were removed quantitatively leaving a solution of plasticizer in the 1-methyl-2-pyrrolidone. Separation was accomplished by distilling away the 1-methyl-2-pyrrolidone under reduced pressure conditions leaving the plasticizer as a pot liquor in reusable condition in roughly the same yields as defined for Examples 30 through 32.

I claim:

1. A process for the recovery of a reusable polyvinylchloride base composition from scrap material consisting of the constituents to be reused and contaminants associated therewith, which process comprises:
    comminuting the scrap material into small pieces;
    digesting the small pieces of scrap in a polar aprotic solvent for any polyvinylchloride polymer and copolymer in said scrap, for a time sufficient to effect complete dissolution of the polyvinylchloride polymer and copolymer content of said scrap;
    filtering the resulting mixture and separately recovering a liquid filtrate containing the polymer content, in solution, and a solid residue containing constitutents of said scrap material which did not dissolve in said polar aprotic solvent;
    then precipitating the polymer from solution in said filtrate by flushing said polymer from said solution in said filtrate by addition of a flushing liquid selected from the group consisting of water, saturated hydrocarbons having boiling points at least 50°C less than the boiling point of said polar aprotic solvent and which does not form an azeotrope with said polar aprotic solvent and mixtures consisting of said saturated hydrocarbons and lower aliphatic ($C_1 - C_4$) alcohols:
    and recovering the precipitated solid polymer containing material, separately from the liquid in which it was precipitated.

2. The process of claim 1 including in addition the steps of
    squeezing the recovered precipitated solid material thereby expelling flushing liquid and polar solvent adhering to the precipitated polymer; and
    separately recovering the expelled liquid and the squeeze-dried polymer; and
    returning the expelled liquid to the process of claim 1.

3. The process of claim 2 including vacuum drying the squeese-dried polymer residue, which is obtained after expulsion of the flushing liquid and polar solvent from said residue.

4. The process of claim 1 wherein the scrap being processed consists primarily of polyvinylchloride, polyvinylidene chloride and copolymers based on said polymers and mixtures of said polymers.

5. The process of claim 1 wherein the flushing liquid is water and the process includes:
    collecting the mixture of water and polar aprotic solvent which is separated from the precipitated polymer containing solid material, at each of the stages of the process where such a separation is effected; and
    separating the water from the polar aprotic solvent by distillation for their separate return to the process of claim 1.

6. The process of claim 1 wherein the flushing liquid comprises at least one saturated hydrocarbon having a boiling point at least 50°C below the boiling point of said polar aprotic solvent and not forming an azeotrope with said polar aprotic solvent; and the process includes:
    recovery of the mixture of the hydrocarbon and the polar aprotic solvent and the plasticizer which is separated for the precipitated polymer containing solid material;
    effecting a rough separation of a fraction containing the aprotic solvent from a fraction containing the hydrocarbon and plasticizer;
    distilling the recovered hydrocarbon-plasticizer fraction; and
    separately recovering the plasticizer and the hydrocarbon.

7. The process of claim 6 wherein said flushing liquid is applied to the scrap in increments.

8. The process of claim 6 wherein the separation of plasticizer from the mixture of plasticizer, hydrocarbon and polar aprotic solvent is effected in a plurality of extractions with the hydrocarbon as extractant.

9. The process of claim 1 wherein the flushing liquid is a mixture of aliphatic alcohols and saturated hydrocarbons, wherein said alcohols are selected from the group consisting of methyl, ethyl, propyl and butyl alcohols and said hydrocarbons are selected from hydrocarbons having boiling points of at least 50°C below the boiling point of said polar aprotic solvent and not forming an azeotrope therewith.

10. The process of claim 9 wherein the flushing luquid comprises about one part alcohol to two parts hydrocarbon.

11. The process of claim 9 including in addition distilling the mixture of alcohol, hydrocarbon, polar aprotic solvent and plasticizer and separately recovering the alcohol and hydrocarbon.

12. The process of claim 9 wherein the mixture separated from the precipitated polymer containing solid is processed for separate recovery of the aprotic solvent, alcohol, hydrocarbon and plasticizer contained therein by distilling said mixture and recovering the alcohol and hydrocarbon as a distillate, suitable for return to the process as a flushing liquid; and the polar solvent and plasticizer as a pot liquor, and thereafter separating the plasticizer from the polar solvent by distillation.

13. The process of claim 9 wherein the mixture separated from the precipitated polymer containing solid is processed for separate recovery of the aprotic solvent, alcohol, hydrocarbon and plasticizer contained therein by distilling said mixture and recovering the alcohol as a distillate, and a mixture containing the hydrocarbon, plasticizer and polar aprotic solvent as a residue; and separating said solvent from the remaining constituents by extraction in a separatory funnel.

14. The process of claim 9 wherein the mixture separated from the precipitated polymer containing solid is processed for separate recovery of the aprotic solvent, alcohol, hydrocarbon and plasticizer contained therein by distilling said mixture and recovering the alcohol and hydrocarbon as a distillate, suitable for return to the process as a flushing liquid; and the polar solvent and plasticizer as a pot liquor and thereafter separating the plasticizer from the solvent by adding water to said pot liquor whereby the plasticizer is precipitated and recovered separately from the aprotic solvent.

15. The process of claim 1 wherein said polar aprotic solvent is selected from the group consisting of 1,1,2,2-tetraethylurea, e-caprolactam, hexamethyl phosphoric triamide, gamma-butyrolactone, dimethylsulfoxide, and sulfolane.

16. The process of claim 1 wherein the saturated hydrocarbons are selected from the group consisting of cyclohexane, cyclopentane, hexane, heptane, octane, lead-free aviation gasoline, low boiling point kerosene, turpentine and iso-octane.

* * * * *

UNITED STATES PATENT OFFICE
CERTIFICATE OF CORRECTION

Patent No. 3,912,664    Dated October 14, 1975

Inventor(s) Eugene Wainer

It is certified that error appears in the above-identified patent and that said Letters Patent are hereby corrected as shown below:

In the title; "COGENERS" should be -- CONGENERS --.

Column 1, in the title "COGENERS" should be -- CONGENERS --.

Column 1, lines 5-30 should be included with the Abstract.

Column 2, line 45; "been" should be -- better --.

Column 2, line 52; the quotes are missing from the word "rigid".

Column 2, line 54; the quotes are missing from the word "flexible".

Column 2, line 59; the quotes are missing from the word "Rigid".

Column 3, line 54; "U.S. Pat. No. 2,284,142" should be the beginning of a new paragraph.

Column 4, line 36; after "receipt" the period (.) should be a comma (,).

Column 4, line 44; "receipt," should be -- form --.

Column 9, line 50; "state" should be -- stage --.

UNITED STATES PATENT OFFICE
CERTIFICATE OF CORRECTION

Patent No. 3,912,664  Dated October 14, 1975

Inventor(s) Eugene Wainer

It is certified that error appears in the above-identified patent and that said Letters Patent are hereby corrected as shown below:

Column 10, line 32; "approximately" should be -- approximating --.

TABLE 1, in column heading above "NAME" delete "BOILING" (in Column 10)

TABLE 1, Continued, in column heading above "NAME" delete "BOILING" (in Column 11)

TABLE 1, Continued, in column heading above "POINT" insert -- BOILING --.

TABLE 4, in column heading above "SOLVENT NO." delete "SCRAP".

TABLE 4, in column heading above "BATCH A" delete "VOL. OF SOLVENT" and insert -- SCRAP --.

TABLE 4, in column heading above "IN CC'S" delete "TEMPERATURE" and insert -- VOL. OF SOLVENT --.

TABLE 4, in column heading above "°C." delete "TIME" and insert -- TEMPERATURE --.

TABLE 4, in column heading above "MINUTES" insert -- TIME --.

Signed and Sealed this fourth Day of May 1976

[SEAL]

Attest:

RUTH C. MASON
Attesting Officer

C. MARSHALL DANN
Commissioner of Patents and Trademarks